United States Patent [19]

Mungovan et al.

[11] Patent Number: 5,061,309
[45] Date of Patent: Oct. 29, 1991

[54] MULTIPLE ROW PUSHER SYSTEM FOR GLASS FORMING MACHINE

[75] Inventors: John P. Mungovan, Simsbury; Vaughan Abbott, East Hartland; Gary R. Voisine, South Windsor; Timothy J. Liska, West Simsbury, all of Conn.

[73] Assignee: Emhart Industries, Inc., Towson, Md.

[21] Appl. No.: 651,319

[22] Filed: Feb. 6, 1991

[51] Int. Cl.⁵ .............. C03B 35/10; B65G 25/00
[52] U.S. Cl. .................. 65/260; 198/468.01; 198/470; 198/470.1
[58] Field of Search .............. 65/260; 198/468.01, 198/470

[56] References Cited

U.S. PATENT DOCUMENTS

| | | | |
|---|---|---|---|
| 3,305,342 | 2/1967 | Hafferkamp | 65/260 |
| 4,351,663 | 9/1982 | Wood | 65/260 X |
| 4,771,878 | 9/1988 | Braithwaite et al. | 198/468.01 |
| 4,830,653 | 5/1989 | Montemayor-Quiroga et al. | 65/260 |
| 4,927,444 | 5/1990 | Voisine | 198/468.01 X |

Primary Examiner—Robert L. Lindsay
Attorney, Agent, or Firm—Spencer T. Smith

[57] ABSTRACT

A pusher system for transferring formed glass bottles from a plurality of deadplates which are part of an I.S. machine to a common conveyor. A discrete pusher is associated with each dead plate and can transfer the bottles on that dead plate to either of two spaced lines along the conveyor thereby enabling a multiplicity of bottle rows to increase conveyor capacity.

5 Claims, 3 Drawing Sheets

MULTIPLE ROW PUSHER SYSTEM FOR GLASS FORMING MACHINE

The present invention relates to pushouts for I.S. glass container forming machines.

Each section of an I.S. machine deposits finished bottles on a dead plate and a pushout mechanism displaces the bottles from the dead plate through an angle of about from 90° to 120° onto a moving conveyor. Such pushouts have a set program of displacement with the pusher fingers of the mechanism first being axially advanced to the dead plate to receive the formed bottles and following a short period of time during which the bottles settle down, then rotated through a circular arc to deposit the bottles on the conveyor. The pusher fingers are then axially retracted leaving the bottles on the conveyor and rotated back to their initial position.

As I.S. machines increase in speed conveyor capacity must be increased and this is normally achieved by speeding up the conveyor. This is undesirable since bottle control lessens as conveyor speed increases.

It is accordingly an object of the present invention to increase the capacity of the conveyor without suffering a loss in bottle control.

Other objects and advantages of the present invention will become apparent from the following portion of this specification and from the accompanying drawings which illustrates in accordance with the mandate of the patent statutes a presently preferred embodiment incorporating the principles of the invention.

Referring the drawings.

Figure 1:
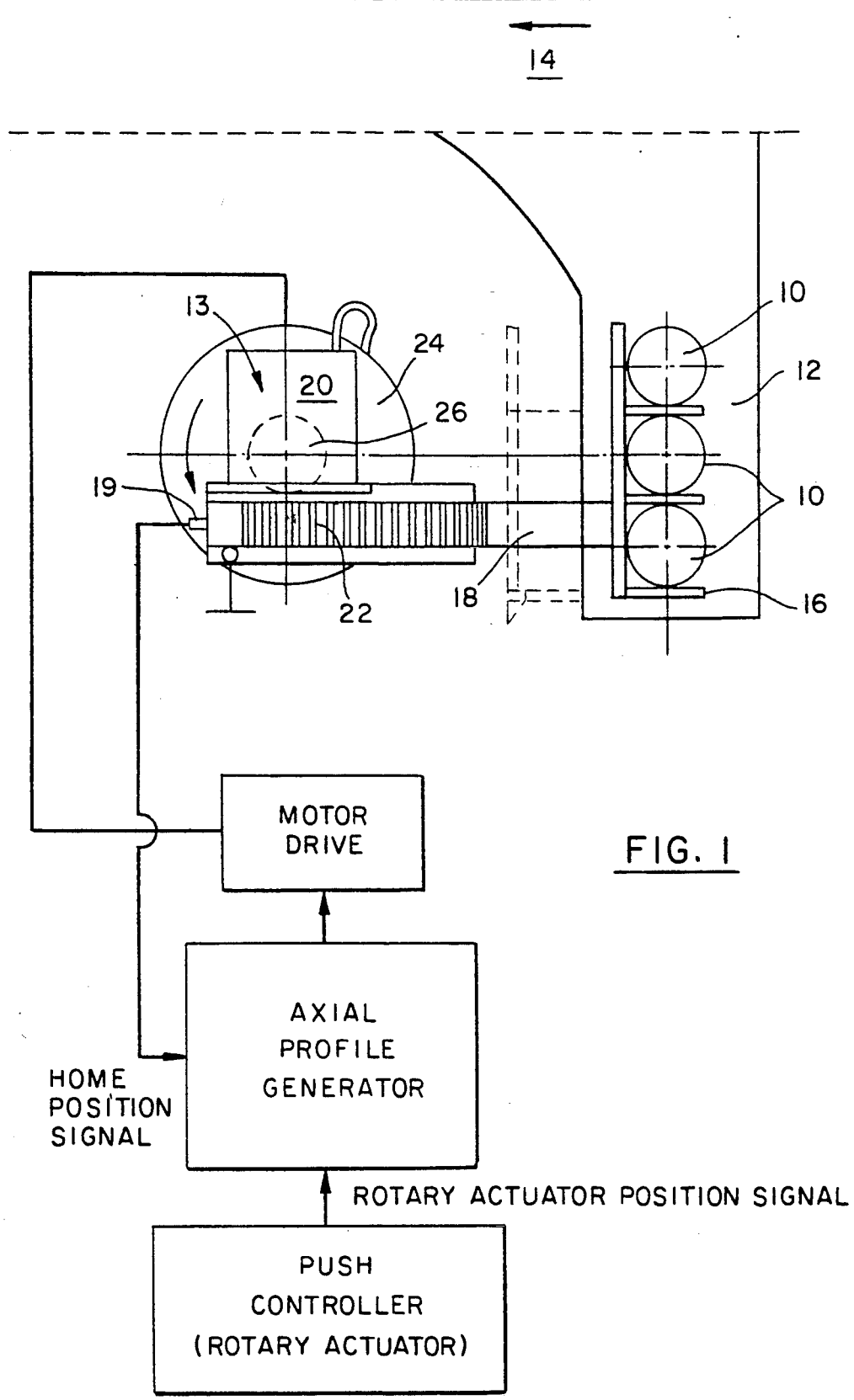
FIG. 1 is a top view of the pushout mechanism made in accordance with the teachings of the present invention.

Formed glass bottles 10 which were deposited on a dead plate 12 of an individual section of an I.S. machine will be pushed by a pusher mechanism 13 from the dead plate 12 onto a moving conveyor 14. The pusher mechanism 13 is made up of pusher fingers 16 secured to a rack element 18, a first programmable stepping motor 20 (which could be a servo motor), a drive gear 22 connected to the motor output shaft and drivingly engaging the rack to axially advance the rack and hence the pusher fingers, and a support plate 24 which is pivotably displaceable about a vertical axis by a second programmable stepping motor 26.

At the beginning of a cycle, the rack element 18 is fully retracted and this position is verified by a Home Position Signal issued by a start position sensor 19. The Pushout Controller then instructs the Axial Profile Generator to define a first rack advance velocity profile to drive the Motor Drive to advance the motor and hence the rack and the pusher fingers a predetermined stroke (A).

Figure 2:
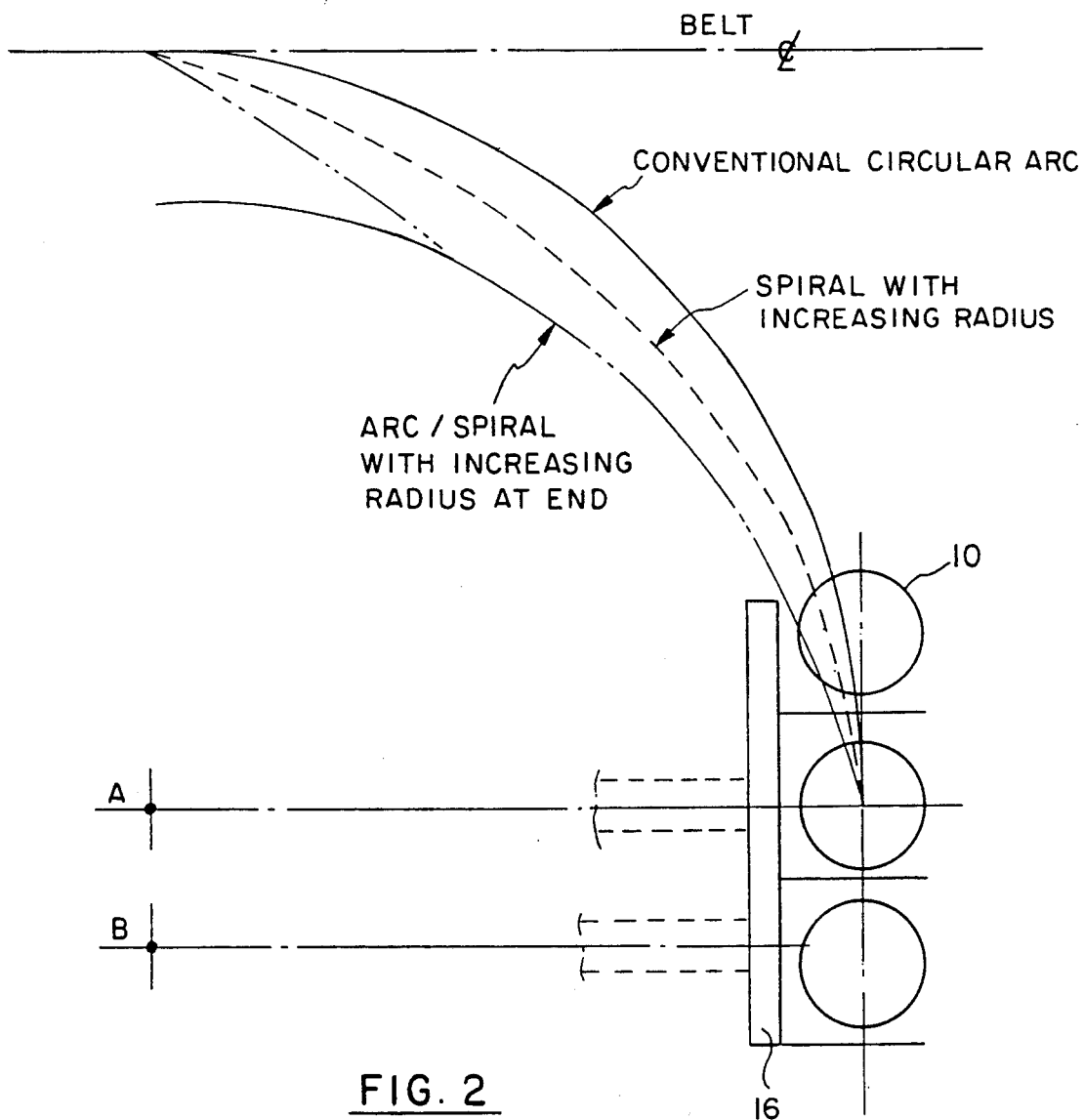
FIG. 2 is a schematic comparison of the pushout path of a conventional pushout and possible pushout paths of a pushout made in accordance with the teachings of the present invention.

When the pusher fingers pivot to push the bottles onto the conveyor, the Axial Profile Generator will define a second rack advance axial displacement profile. This profile may conform to the conventional circular arc of the pusher fingers which is illustrated in FIG. 2 or it may be a new spiral path which can either be a pure spiral or initial part circular arc followed by a spiral.

Figure 3:
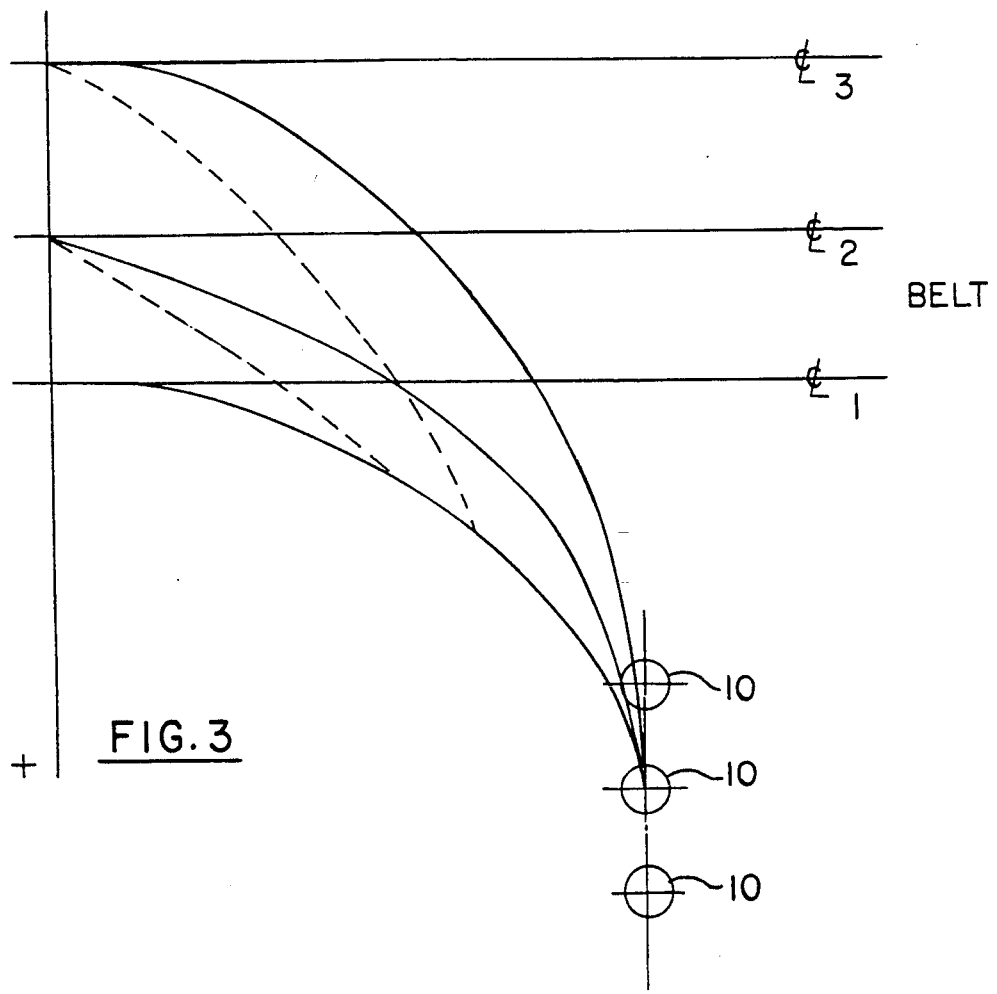
FIG. 3 is a schematic presentation showing how the pushout of FIG. 1 can deposit bottles multiple lines on the conveyor.
Figure 4:
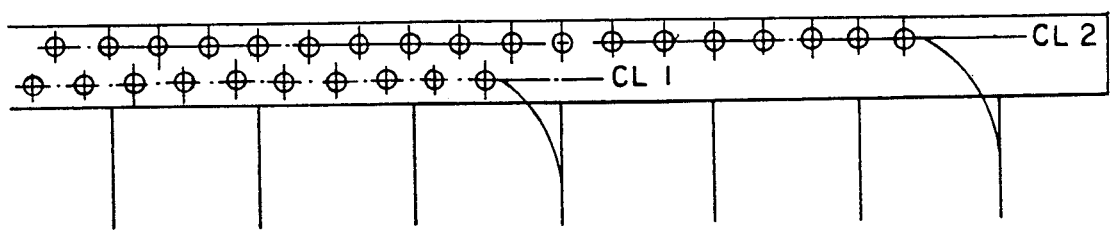
FIG. 4 schematically shows how a series of pushouts can feed two lines of bottles on the conveyor.

It is now possible to deposit bottles on the conveyor belt along more than one line. As shown in FIG. 3, the pusher fingers can follow a conventional circular arc to deposit bottles along a first center line (CL1) or can follow an arc being a spiral or having at least a spiral portion to deposit bottles along second (CL2) and third (CL3) center lines. FIG. 4 illustrates the placement of bottles along two lines to cut the pusher finger speed in half. Three or more lines of bottles could be defined in this manner.

We claim:

1. A pusher system including a plurality of pusher mechanisms, each displacing at least one bottle from an at rest position on a corresponding plurality of dead plates on an I.S. machine through a predetermined angle onto a moving conveyor belt, each of said pusher mechanisms comprising pusher fingers having at least one ware receiving receptacle, means for axially advancing said pusher fingers from a retracted position to an advanced position to receive at least one bottle on an associated deadplate, means for displacing said pusher fingers of at least one of said pusher mechanisms from said advanced position to a first deposit location along a first bottle line on the conveyor, and means for displacing said pusher fingers of at least one of said pusher mechanisms from said advanced position to a second deposit location along a second bottle line on the conveyor paralleled to and spaced from said first bottle line, so that bottles will be deposited on the conveyor along the first and second bottle lines.

2. A pusher system according to claim 1, further comprising means for pivotally supporting said axially advancing means, and wherein said means for, displacing said pusher fingers from said advanced position to said first deposit location comprises means for pivotally displacing said supporting means from a start angle to a finish angle, and means for axially displacing said pusher fingers from said advanced position to a further advanced position during at least a portion of said pivotal displacement from said start angle to said finish angle.

3. A pusher system according to claim 2, wherein said means for displacing said pusher fingers from said advanced position to said second deposit location comprises means for pivotally displacing said supporting means from a start angle to a finish angle, and means for axially displacing said pusher fingers from said advanced position to a further advanced position during at least a portion of said pivotal displacement from said start angle to said finish angle.

4. A pusher system according to claim 2, wherein said pusher fingers are axially advanced from said advanced position to said further advanced position during the entire portion of said pivotal displacement.

5. A pusher system according to claim 3, wherein said pusher fingers are axially advanced from said advanced position to said further advanced position during the entire portion of said pivotal displacement.

* * * * *